(12) United States Patent
Chelf

(10) Patent No.: US 8,858,308 B2
(45) Date of Patent: Oct. 14, 2014

(54) METHODS AND APPARATUS FOR EFFICIENTLY PRESSURIZING AND VENTILATING AN AIR-SUPPORTED STRUCTURE

(75) Inventor: Jonathan David Chelf, San Diego, CA (US)

(73) Assignee: Airstream Intelligence, LLC, Solana Beach, CA (US)

( * ) Notice: Subject to any disclaimer, the term of this patent is extended or adjusted under 35 U.S.C. 154(b) by 1290 days.

(21) Appl. No.: 12/306,712

(22) PCT Filed: Jun. 27, 2007

(86) PCT No.: PCT/US2007/015016
§ 371 (c)(1),
(2), (4) Date: Dec. 26, 2008

(87) PCT Pub. No.: WO2008/005279
PCT Pub. Date: Jan. 10, 2008

(65) Prior Publication Data
US 2009/0320380 A1     Dec. 31, 2009

Related U.S. Application Data

(60) Provisional application No. 60/817,208, filed on Jun. 27, 2006.

(51) Int. Cl.
*F24F 11/00*     (2006.01)

(52) U.S. Cl.
USPC ............... 454/31; 454/251; 454/267; 52/2.11

(58) Field of Classification Search
USPC .............. 135/93; 137/512.1; 454/10, 11, 251, 454/259, 267, 27, 275, 29–31, 335, 34; 52/2.11, 2.17
See application file for complete search history.

(56) References Cited

U.S. PATENT DOCUMENTS 2,910,994 A * 11/1959 Joy ................................ 52/2.11
2,948,286 A * 8/1960 Turner ................................ 52/1

(Continued)

FOREIGN PATENT DOCUMENTS

| FR | 2648192 A1 | 12/1990 |
| JP | S60-94031 A | 5/1985 |

(Continued)

OTHER PUBLICATIONS

Translation of Japanese Office Action dated Aug. 9, 2011, in connection with corresponding Japanese Patent Application No. 2009-172111.

(Continued)

*Primary Examiner* — John K Fristoe, Jr.
*Assistant Examiner* — R. K. Arundale
(74) *Attorney, Agent, or Firm* — Mintz Levin Cohn Ferris Glovsky and Popeo, P.C.

(57) ABSTRACT

A set of methods and apparatus for efficiently pressurizing and ventilating an air-supported greenhouse or other structure requiring pressurization and ventilation.
A method for efficiently pressurizing and ventilating an air-supported structure comprises directing any external wind flow and external wind pressure into mechanical flow means, such as a fan, or fans in parallel, operating in the intake direction, and into the internal space of the air-supported structure and out of the internal space of the air-supported structure through internal pressure regulating exhaust means, whereby the internal space of the structure will be ventilated and pressurized with the assistance of any external wind and the reliability of mechanical flow means (fans). This method allows for the efficient, effective, and economical cooling, through ventilation, of a protected space created by a light permeable membrane (cover), which is supported only by internal air pressure against the weight of the membrane and dynamic pressures of the external wind, itself. Apparatus for directing any external wind flow and external wind pressure into mechanical flow means are disclosed. Methods and apparatus for internal pressure regulation are also disclosed.
Some benefits are less power consumption, minimal internal static pressure (just enough to overcome the external wind), less potential film breakage (than conventional frame-supported poly greenhouses), more light transmission, less cost, and more portability.

22 Claims, 6 Drawing Sheets

(56) References Cited

U.S. PATENT DOCUMENTS

| | | | |
|---|---|---|---|
| 3,055,379 A * | 9/1962 | Fink | 52/2.18 |
| 3,123,085 A | 3/1964 | Demarteau | |
| 3,261,659 A * | 7/1966 | Schwichtenberg et al. | 422/4 |
| 3,265,059 A * | 8/1966 | Matthews | 600/21 |
| 3,561,174 A | 2/1971 | Schneidler | |
| 4,067,347 A | 1/1978 | Lipinski | |
| 4,164,829 A | 8/1979 | Sadler | |
| 4,200,117 A * | 4/1980 | Anderson et al. | 137/512.1 |
| 4,936,060 A * | 6/1990 | Gelinas et al. | 52/1 |
| 5,328,405 A * | 7/1994 | Jarnot | 454/78 |
| 5,331,991 A | 7/1994 | Nilsson | |
| 5,685,122 A | 11/1997 | Brisbane et al. | |

FOREIGN PATENT DOCUMENTS

| | | |
|---|---|---|
| JP | S61-162684 A | 7/1986 |
| JP | 62-032154 U | 2/1987 |
| JP | 05-007868 A | 1/1993 |

OTHER PUBLICATIONS

English translation of Office Action issued in Japanese patent application No. 2012-026704.

\* cited by examiner

METHODS AND APPARATUS FOR EFFICIENTLY PRESSURIZING AND VENTILATING AN AIR-SUPPORTED STRUCTURE

CROSS-REFERENCE TO RELATED APPLICATIONS

This application is a National Stage Entry of PCT/US07/15016, filed Jun. 27, 2007, titled "Methods and Apparatus for Efficiently Pressurizing an Ventilating n Air-Supported Structure," which claims the benefit under 35 U.S.C. §119(e) of Provisional Ser. No. 60/817,208, filed Jun. 27, 2006, titled "Methods and Apparatus for Efficiently Pressurizing an Ventilating n Air-Supported Structure."

BACKGROUND

This invention relates to greenhouses or similar structures which require the removal of large quantities of heat flux. Specifically, this invention relates to a method and structural means to utilize external wind energy, both pressure and flow, as well as to produce and control both air pressure and air flow within an air-supported structure, such as an air-supported greenhouse.

To date, commercial greenhouses are constructed with framing covered with a transparent or translucent, air and water impermeable material. The primary function of the frame is to support the covering material against its own weight, wind, rain, and potential snow loads. The frame also supports doorways for passage into or out or the greenhouse. Often the frame supports means for ventilation. This ventilation may be passive, by way of external wind and/or thermal convection, or active ventilation via a fan or fans.

One particular version of commercial greenhouses consists of attaching two layers of plastic film to a frame thereby sealing the edges of the two layers together. Air, usually from the outside in order to avoid condensation, is forced between the two layers of plastic with a small blower, thereby separating the two layers and maintaining tension in the film. This technique was developed in 1964 and is an improvement over single layer structures in two ways. First, it provides an insulating air space between the two layers of plastic film. Secondly, it reduces the likelihood of whipping, then ripping, of the plastic film in the wind, thereby increasing the life of the film. Disadvantages with this system are the cost of an extra layer of plastic film and blower and the reduced transmission of light, 10% or more reduction, into the greenhouse. Another potential disadvantage is that, depending on the inflation blower's position, orientation, and surroundings, the dynamic pressure of the external wind can add to or subtract from the air pressure between the two layers of plastic film. For wind conditions that lead to a reduction in the internal air pressure, this effect can potentially lead to whipping and ripping of the plastic film. For wind conditions that lead to an increase in the internal air pressure, this effect can potentially lead to over pressurization and ripping of the plastic film.

For all current versions of commercial greenhouses, a frame has been required to support the plastic film or other glazing. While the frame serves some use, it is expensive and blocks a portion of the sunlight from reaching the plants in the greenhouse. Due to these deficits, alternatives have been sought to replace the framing material. One experimental approach has been to replace the typically wood or metal frame with an air pressurized frame, or air-beams. These frames, usually of transparent plastic, are flaccid without internal air pressurization. Upon pressurization, they become rigid and take their intended shape. U.S. Pat. No. 2,854,014 to Hasselquist (1958) describes an "Inflatable Shelter" supported by inflated tubing. U.S. Pat. No. 4,856,228 to Robinson, Sr. (1989) also describes a "Tunnel system for care or seeds, plants and the like" supported by inflated tubing.

An alternate approach has been to integrate the inflatable frame into the covering so that essentially the entire light-transmitting surface is made rigid by pressurized air. This approach also provides an insulating air space between the layers of covering. U.S. Pat. No. 4,160,523 to Stevens (1979) and U.S. Pat. No. 6,061,969 to Leary (2000) both utilize this strategy.

The term "air-inflated structure" describes the above mentioned inflatable structures, where the shape of the structure is produced by air pressurized tubes or cells, while the air within the enclosed space of the structure remains unpressurized. Transparent, air-inflated structures, when used as a greenhouse, still have the same requirements for ventilation, heating, and cooling as conventional greenhouses.

The alternate design, the "air-supported structure," is comprised of a membrane, which is anchored and sealed to a wall or the ground at the edges, and air pressurization means within the enclosed space of the structure to keep the membrane suspended and taught. Airlocks are usually attached for ingress and egress. Air-supported structures have critical issues with respect to pressurization and ventilation, which are required to maintain the integrity and inhabitability of the structure. Additionally, both pressure and ventilation effect the energy consumption of the structure.

Methods and apparatus have been developed to control internal pressures based on external wind, snow, and ice loads as well as the air-supported membrane's height and tension. The goal is to maintain the minimal internal pressure, relative to the external pressure, necessary to maintain the structural integrity of the membrane and its height, i.e. clearance above the floor. Minimalizing the pressure differential between inside and outside minimalizes the tension within the membrane and the energy requirements for inflation. Therefore, sensors and controls have been sought to maintain idea pressurization. U.S. Pat. No. 2,948,286 to Turner (1960) utilizes mechanical means, which measure membrane height, side wall erectness, or membrane tension, to activate a switch which controls the operation of an inflation blower thereby controlling the internal pressure and the resulting membrane height, side wall erectness, and membrane tension. However, no exhaust vents are included in this invention as ventilation is not within the scope of this particular invention. U.S. Pat. No. 3,159,165 to Cohen, et al. (1964) utilizes mechanical means, which measures the structure's girth to activate a switch which controls the operation of an inflation blower thereby controlling the internal pressure and the resulting structure's girth. Here again, no exhaust vents are included in this invention as ventilation is not within the scope of this particular invention. U.S. Pat. No. 4,936,060 to Gelinas, et al. (1990) utilizes radar means, which measures the membrane's height, to control the operations of an inflation blower and exhaust vent, thereby controlling the internal pressure and volume and the resulting membrane's height U.S. Pat. Nos. 5,685,122 to Brisbane, et al. (1997) and 6,032,080 to Brisbane, et al. (2000) utilize sensor means, which measure eternal wind speed and potential conditions for snow and ice loading, to control the operation of an inflation blower and exhaust ventilation thereby controlling the internal pressure.

In the two patents to Brisbane, et al., only one location is specified for the air pressure sensor, namely within the air-supported structure. The pressures specified in the process control element of the invention are differential pressures, not absolute pressures. That is to say that the specified static pressures of 0.4"-1.4" of water column are much less than atmospheric pressure and really represent the difference between inside and outside pressures, or more precisely outside static pressure, which discounts the dynamic pressure of the wind. Therefore, there would need to be a sensor external to the structure to sense the outside static pressure. There is a "wind velocity sensor" indicated on top of the structure which is stated as an anemometer, but there is no description of linking this sensor to the static pressure sensor disclosed in the patent. Also, only wind speeds without respect to wind direction are described relative to the wind sensor.

Ultimately, the position and orientation of a necessary outside static pressure sensor is critical to the successful operation of the invention being disclose. For example, a wind speed of 25 MPH has a dynamic pressure of 0.3" of water column. Under these conditions, the external pressure on the air-supported structure's surface, as would be the case in a domed structure indicated in the figure, can vary from "atmospheric pressure plus 0.3" of water column" on the upwind side to "atmospheric pressure minus 0.3" of water column" on the side (between upwind and downwind) as well as the top. At 50 MPH, these variations quadruple to +/−1.2" of water column. Thus, if the outside static pressure sensor were on the top or side (relative to the wind) of the structure and the internal pressure, which is uniform within the structure, were 1.4" of water column above the outside pressure sensed, then the upwind side of the structure would collapse as the external pressure would be 1.0" of water column pressure above the internal pressure (1.2"+1.2"−1.4"). Therefore, this invention, unless appropriately modified, is destined to fail.

The second critical issue for air-supported structures is ventilation. Of air-supported structures, most have been made with low-transparency, high-reflectivity membranes to reduce the radiant energy flux into and out of these structures, whereby reducing the cooling and heating requirements of the structure. These structures have covered tennis courts, pools, athletic fields and stadiums. Ventilation is required to remove the reduced solar radiant energy flux and/or occupant emissions, whichever is greater. Ventilation requirements under these conditions are much less (80%-90% less) than ventilation requirements for greenhouses, where the nearly full solar radiant energy flux needs to be removed from the greenhouse in order to prevent overheating.

Ventilation necessary to meet the summertime cooling requirements for greenhouses is approximately 10 cubic feet per minute for every square foot of floor space. In a frame-supported greenhouse, this is achieved with relatively low pressure (up to 0.25" of water column) propeller fans, as opposed to high pressure blowers used in air-supported structures. Under typical summertime conditions, a 48" diameter propeller fan with a 1 hp motor is sufficient to ventilate and cool approximately 2,000 square feet of floor space.

For a typical air-supported structure, a 25" wheel diameter blower with a 10 hp motor would be required to produce the same ventilation, because of the higher pressure within the air-supported structure compared to the frame-supported structure. Therefore, scaling the present air-supported structure technology to a greenhouse facility would require 10 times the electrical power.

One manufacturer of air-supported structures, Environmental Structures Incorporated, has addressed this issue by replacing the high power blowers with medium pressure (up to 0.5" of water column) propeller fans. Under relatively calm conditions, these fans require 2-3 times the power of the frame-supported greenhouse fans. In the event of windy conditions, a tandem fan, two medium pressure fans placed in series, is turned on, thereby doubling the pressure, which is necessary to support the membrane against the dynamic pressure of higher winds. The net result is that the electrical energy consumption of this system is about 3 times that of a typical greenhouse. Because of this higher operating cost and an initial cost twice that of conventional greenhouses, these air-supported greenhouses have seen only individual use.

One way to reduce this energy consumption has been to reduce, or almost eliminate, the ventilation. Individual examples are at:

http://www.actahort.org/books/42/42 5.htm and
http://www.sunset.com/sunset/Premium/Garden/1997/02-Feb/Greenhouse297/Greenhouse297.html and
http://savagefarmer.blogspot.com/2006/02/big-greenhouse.html Each of these greenhouses lacks the ventilation necessary to sufficiently cool them in the summer as stated in the each of the above sources.

Yet another attempt to overcome these deficiencies was made by the University of Arizona Environmental Research Laboratory in cooperation with the University of Sonora, Mexico. In 1968.air-supported greenhouses were pressurized by a blower but not ventilated. The cooling was accomplished by drawing air through a packed-column heat exchanger which was sprayed with cool saltwater from the nearby sea. This system, however, kept the relative humidity in the greenhouse near 100%, which is not ideal for many plants.

Within the scope of the invention, three other examples of prior art are worth mentioning. U.S. Pat. No. 3,924,364 to Eerkens (1975) describes a "Wind-Inflatable Tent." Here the wind's dynamic pressure is utilized to pressurize, but not ventilate, an air-supported tent. An externally supported opening to the tent is pointed into the wind. No means for tracking the wind are provided. The tent is utilized as a means for escape from the wind, i.e. shelter.

Another shelter, described in U.S. Pat. No. 6,070,366 to Pierson (2000), includes a rotatable air scoop with a wind wane on the opposite side of the air scoop's opening, apparently to automatically turn the opening into the wind. A louvered vent is just inside the opening of the air scoop and oriented to only allow air from the outside wind into the air scoop and then into the shelter. The louvers only operate and allow air into the shelter when the total (dynamic plus static) pressure of the wind somewhat exceeds the internal air pressure. A plurality of these air scoops would be attached to the roof fabric of the shelter. The function of these rotatable air scoops is to allow for additional inflation as a result of local wind conditions over the surface of the shelter. The air scoops are not the primary means of inflation for the shelter. These air scoops are not connected to any mechanical means, such as a blower or fan, to inflate the shelter. Also, no exhaust vents are included in this invention as ventilation is not within the scope of this particular invention.

Lastly, Tom Elliot describes a passive air conditioning system using a rotatable air scoop directing wind flow through evaporative cooling pads and into a house in order to cool the house, but not to pressurize it. The description is located at:

http://www.thedisease.net/arcana/survival/How-To Survival Library/library2/aircool.htm As the system is passive, no fans are used to augment the flow, which is created by wind and the natural convection of the cooled air flowing down a tower and into the house.

In conclusion, I am not aware of any air-supported or frame-supported structure that provides a method or apparatus for directing wind energy, i.e. pressure and flow, into any mechanical ventilation device, such a fan or blower, thereby ventilating and potentially pressurizing the internal space of a structure utilizing the energies of both the wind and the mechanical ventilation device. In addition, I am not aware of any air-supported or frame-supported structure that provides a method or apparatus for determining or directing the outside dynamic wind pressure and outside static pressure, independently, to control an exhaust vent, thereby regulating the internal pressure of the structure relative to the outside dynamic wind pressure and outside static pressure.

SUMMARY

Benefits—less power consumption, minimal internal static pressure (just enough to overcome the external wind), less potential film breakage (than frame-supported single poly), more light transmission, less cost, more portable The invention is a set of methods and apparatus for efficiently pressurizing and ventilating an air-supported greenhouse or other structure requiring pressurization and ventilation.

The primary method for efficiently pressuring and ventilating an air-supported structure comprises directing any external wind flow and external wind pressure into mechanical flow means, such as a fan, or fans in parallel, operating in the intake direction, and into the internal space of the air-supported structure and out of the internal space of the air-supported structure through internal pressure regulating exhaust means, whereby the internal space of the structure will be ventilated and pressurized with the assistance of any external wind and the reliability of mechanical flow means (fans). This method allows for the efficient, effective, and economical cooling, through ventilation, of a protected space created by a light permeable membrane (cover), which is supported only by internal air pressure against the weight of the membrane and dynamic pressures of the external wind, itself.

An alternate method for efficiently pressurizing and ventilating an air-supported structure is as in the primary method except that internal pressure regulation would control the mechanical flow means (which may include speed control—on/off or variable—of one or more fans as well as dampers), not the exhaust means. Here the exhaust means, or exhaust port, are either fixed or manually adjusted, and the fan(s) speed or area would be controlled. This is not the preferred method as airflow is always required to produce the necessary internal pressure to support the structure as long as the exhaust port is not fully closed. However, in the primary method, above, the internal pressure regulating exhaust means can become nearly closed to maintain the internal pressure under low airflow conditions, as may be desirable in cold weather conditions.

The additional benefit of the primary method for efficiently pressurizing and ventilating an air-supported structure is that, when the external wind exceeds about 10 mph, the power required for the mechanical flow means to support and ventilate the structure is negligible. That is to say that when restrictions in the airflow through the air-supported structure being ventilated are located at the exhaust (as opposed to solely at the intake), the wind itself is sufficiently forceful above about 10 mph to ventilate and support the structure. This is possible because these air-supported structures can be configured, given their shape and surroundings, so as to never take the direct (only oblique) incidence of the wind (therefore not requiring the internal pressure to be as great as the external total pressure plus the membrane weight), whereas the invention here is to redirect nearly the full wind force, the external total pressure, into the structure through mechanical flow means. Below about 10 mph, the mechanical flow means are needed to ventilate the structure at a pressure differential sufficient to hold up the membrane (which is about the dynamic pressure of a 5 mph wind). Therefore, only low power motors are required to operate these structures, which become wind powered in winds above about 10 mph. This is the rational for combining wind redirection and mechanical flow means in series. Mechanical flow means may include intake vents with dampers, but no fans, in parallel with intake vents with fans, with or without dampers, so as to bypass the intakes vents with fans when the structure is operating in a wind only powered mode.

A preferred embodiment of the primary method is a method as above where the mechanical flow means are a set of fans operating in parallel with controllable fan speed (on/off or variable) and/or fan area (e.g. dampers), where the controllable fan speed and/or fan area are regulated by air temperature, solar insolation, and/or humidity levels within the structure as a function of time of day. Here the mechanical flow means are controlling the flow of air through the air-supported structure and the exhaust means are controlling the internal pressure.

An additional improvement of this method is a method as in the preferred embodiment of the primary method where the regulation of the controllable fan speed and/or fan area by air temperature, solar insolation, and/or humidity levels within the structure as a function of time of day can be overridden to increase the pressure within the structure to maintain the structural integrity of the structure. This improvement is useful in the event of failure of pressure regulation at the exhaust port, the opening of a large equipment door, or the perforation of the air-supported membrane.

The invention is also a set of methods and apparatus for efficiently and reliably ventilating a greenhouse or other structure requiring ventilation.

The first method comprises directing any external wind flow and external wind pressure into mechanical flow means, such as a fan, or fans in parallel, operating in the intake direction, and into the internal space of the structure, whereby any external wind flow and external wind pressure assist the mechanical flow means to pressurize and ventilate the structure. As described above for air-supported structures, this method creates internal static pressure, when regulated, which will support the structure against the external wind. Three embodiments of apparatus for this method are described below.

The second method comprises directing any external wind so as to create a low pressure zone, and directing exhaust from mechanical flow means, such as a fan, or fans in parallel, operating in the exhaust direction into that low pressure zone of the external wind, whereby any external wind assists in the airflow through the mechanical flow means (fans). This method is useful for frame-supported greenhouses or the like that employ exhaust fans as a means of mechanical ventilation, because the power required to operate the fans is limited to that under calm conditions. Windy conditions assist the ventilation and therefore reduce the power required to operate the fans. This method is not useful for air-supported structures as this method produces internal static pressures lower than external pressures.

The usefulness and uniqueness of these methods is that external wind is utilized as wind, redirected into ventilation, in series combination with mechanical ventilation means, such as a fan or blower, as backup or augmentation to the external wind's ventilation. The result is reliable ventilation, given the controllable mechanical ventilation means, and reduced electrical energy consumption, given the passive ventilation of the external wind. Either of these two methods stated above are useful for frame-supported greenhouses or the like.

A key component to effectuate the methods for efficiently pressurizing and ventilating an air-supported greenhouse or other structure requiring pressurization and ventilation is the means to direct any external wind flow and external wind pressure into mechanical flow means. Three embodiment of an apparatus to direct any external wind flow and external wind pressure into mechanical flow means are described below.

One embodiment of the apparatus to direct any external wind flow and external wind pressure into mechanical flow means and into the structure is a rotatable air scoop on a hollow tower, which acts to hold the rotatable air scoop up into the path of the external wind and has an air duct to channel a portion of the external wind into mechanical flow means and into the structure. The air scoop is on one side of the vertical axis of rotation with the opening of the air scoop pointing toward the axis of rotation, which forces it to be downwind of the axis. Alternately to the air scoop being on one side of the axis of rotation, the air scoop could have a weather vane or vanes that attach to the backside of the air scoop, pointing away from the opening. In either case, the opening of the air scoop is then automatically pointed into the external wind and redirects any external wind flow and external wind pressure into a fan and into the structure.

A second embodiment of the apparatus to direct any external wind flow and external wind pressure into mechanical flow means and into the structure is a hollow tower with a horizontal cross section of a regular polygon, preferably with 6 or more sides. The upper portion of the tower has hinged flaps that only open inward to allow a portion of the external wind to enter the tower and flow into a fan or fans and into the structure. The flaps are hinged on almost vertical axes to allow for minimal pressure to open the flap while providing a small closing torque produced by gravity. This is accomplished by making the tower slightly wider at the top than the bottom and hinging the flaps on the vertices of the tower. Stops for each flap would be required near the center of the tower to prevent the flap from opening past the center of the tower so that gravity would not produce an opening torque. Alternately, the closing torque could be provided by a torsion spring or a linear spring and a moment arm. The tower connects, acting as an air duct, to the intake fan or fans, which direct the airflow into the structure.

This second embodiment of the apparatus to direct any external wind flow and external wind pressure into mechanical flow means is the preferred embodiment as the flaps, when constructed of lightweight material such as dual walled polycarbonate sheet, will react quickly to sudden changes in the wind direction of even 180 degrees. The angular inertia of the rotatable air scoop can cause it to be slow to react, especially in the event of near 180-degree shifts, and overshoot the wind's direction. Also, the third embodiment, following, is less effective at capturing the external wind pressure.

A third embodiment of the apparatus to direct any external wind flow and external wind pressure into mechanical flow means and into the structure is a berm or wind deflector surrounding the intake area of the intake fan or fans that pressure inflate the greenhouse. The wind deflector would surround the intake fan or fans on 3 sides with a height comparable to or greater than the height of the fan intake or fans, would be located a distance from the fan intake somewhat more than the fan's diameter, and have a rounded top so as to act like an airfoil thereby directing the wind flow into the cavity created by the wind deflector, the ground, the greenhouse side, and the intake fan or fans. The wind deflector could be comprised of adjacent greenhouses arranged in a stagger array so that the intake area of 2 back-to-back, inline greenhouses is bordered by the sidewalls of the adjacent greenhouses. Here, the greenhouses themselves become the airfoil to direct the external wind from any direction into the intake area, thereby increasing the air pressure at the intake.

A method for regulating the internal static pressure of the structure is also described and is comprised of determining the external dynamic pressure through sensing means, determining the external static pressure through sensing means, determining the internal static pressure through sensing means, comparing the internal static pressure to the sum of the external static pressure, a predetermined portion of the external dynamic pressure, and a predetermined membrane offset pressure, opening the exhaust vent by an incremental amount if the internal static pressure is greater than the sum of the external static pressure, a predetermined portion of the external dynamic pressure, and a predetermined membrane offset pressure, or closing the exhaust vent by an incremental amount if the internal static pressure is less than the sum of the external static pressure, a predetermined portion of the external dynamic pressure, and a predetermined membrane offset pressure, whereby the internal static pressure is maintained at the sum of the external static pressure, a predetermined portion of the external dynamic pressure, and a predetermined membrane offset pressure.

In this invention, the predetermined membrane offset pressure may be seasonally adjusted to include a maximum snow accumulation during each season. A method to minimalize snow accumulation is comprised of alternately reducing the internal static sufficient to somewhat reduce the membrane's peak height, then rapidly increasing the internal pressure, thereby producing a repeated whip in the membrane, whereby snow accumulation between cycles substantially slides to the sides of the air-supported structure.

Also in this invention, the phrases "external wind pressure," "external total pressure," "external dynamic pressure," and "external static pressure," all apply to the conditions at a sufficient distance from any structure so as to not be significantly affected by those structures. Airflow over objects produce local dynamic pressures (local air speeds) and local static pressures that vary over the surface of that object, and therefore cannot be treated as single valued references. This is a distinguishing element of this invention as compared to other inventions that do not declare the location of wind or pressure sensors or show wind or pressure sensors to be locally to the structure (e.g. on top, on the side, at the intake or exhaust). These other inventions will produce irregular internal pressure control given the natural variation in external wind speed and direction.

Also in this invention, internal static pressure is treated as single valued within the air-supported structure as its variations are negligible compared to membrane offset pressure or variations in the local static pressures over the external surface of the air-supported structure as the external wind becomes a factor in the support of the structure.

An alternate method for regulating the internal static pressure of the structure is also described and is comprised of determining the external dynamic pressure (i.e. the differential pressure between the external total pressure and the external static pressure) through sensing means, determining the differential pressure between the internal static pressure and the external static pressure through sensing means, comparing the differential pressure between the internal static pressure and the external static pressure to the sum of a predetermined portion of the external dynamic pressure and a predetermined membrane offset pressure, opening the exhaust vent by an incremental amount if the differential pressure between the internal static pressure and the external static pressure is greater than the sum of a predetermined portion of the external dynamic pressure and a predetermined membrane offset pressure, or closing the exhaust vent by an incremental amount if the differential pressure between the internal static pressure and the external static pressure is less than the sum of a predetermined portion of the external dynamic pressure and a predetermined membrane offset pressure, whereby the internal static pressure is maintained at the sum of the external static pressure, a predetermined portion of the external dynamic pressure, and a predetermined membrane offset pressure.

Each of these two methods for regulating the internal static pressure of the structure accomplish the same result, which is that the internal static pressure is maintained at the sum of the external static pressure, a predetermined portion of the external dynamic pressure, and a predetermined membrane offset pressure. The predetermined portion for the external dynamic pressure can be unique to a particular structure within an array of similar structures and is determined by the shape of the structure and its surroundings. The predetermined membrane offset pressure will account for the weight of the membrane or membranes, which also can be unique to a particular structure within an array of similar structures.

An embodiment of the method for regulating the internal static pressure of the structure is also described and is comprised of the directing of external total, i.e. static plus dynamic, pressure to a portion of a side of a movable surface and the directing of external static pressure to remaining portion of the side of the movable surface thereby generating a force, and directing the force to a second movable surface primarily covering an exhaust port of the structure thereby pushing the second moveable surface onto the exhaust port of the structure, and adding a predetermined, external closing force to the second moveable surface, whereby air is only exhausted from the structure when the internal static pressure of the structure exceeds the external static pressure plus a percentage of the external dynamic pressure by a predetermined amount. (The "percentage" is the ratio of the surface area of the moveable surface acted on by the external total pressure to the total surface area of the moveable surface acted on by the internal static pressure.)

A second embodiment of the method for regulating the internal static pressure of the structure is also described and is comprised of the directing of external total, i.e. static plus dynamic, pressure to a portion of a side of a movable surface and the directing of external static pressure to remaining portion of the side of the movable surface thereby generating a force, directing of the internal static pressure to the opposing side of the side of the movable surface thereby generating an opposing force and resulting net force, directing the net force to a second movable surface primarily covering and sliding across an exhaust port of the structure, and adding a predetermined, external closing force to the second moveable surface, whereby air is only exhausted from the structure when the internal static pressure of the structure exceeds the external static pressure plus a percentage of the external dynamic pressure by a predetermined amount. (The "percentage" is the ratio of the surface area of the moveable surface acted on by the external total pressure to the total surface area of the moveable surface acted on by the internal static pressure.)

To achieve the function of these methods for regulating the internal static pressure, any apparatus that performs these methods must orient the exhaust ports so as to not face into the wind. That is to say that the local external total pressure (static plus dynamic) over the exhaust port surface must never exceed the internal static pressure so as in insure exhaust flow of air.

For example, the exhaust port could be an opening in the top of the air-supported structure, where the exhaust port opening will never point into the wind. Also, the exhaust port could be blocked, by a windbreak, from the wind so as to never expose the exhaust port to the dynamic pressure of the wind.

The invention is also a set of methods and apparatus for reducing stress of the air-supported structure's membrane at access portals for ingress and egress, intake and exhaust ports, etc.

The first primary method for reducing stress of the air-supported structure's membrane at an access portal comprises the attaching a frame to the air-supported structure's membrane at an access portal on the above-ground portion of the perimeter of the access portal, which adjoins the ground or foundation, hinging the terminal ends of the frame to the ground or foundation where the hinging axis is collinear with the membrane attachment to the ground or foundation, thereby allowing the frame to pivot toward and away from the enclosed space of the air-supported structure, attaching the functional means (e.g. door, fan or fans, vent, etc.) to the hinged frame, and removing the air-supported structure's membrane within the hinged frame, whereby the access portal may move with the membrane in the wind and to the ground or foundation in the event of deflation without creating undue stress on the membrane in the vicinity of the attached frame.

An improved method for reducing stress of the air-supported structure's membrane at an access portal comprises bending an access portal frame to follow the natural (inflated and undisturbed) contour of the air-supported structure's membrane at the access portal, then attaching the frame to the air-supported structure's membrane at an access portal on the above-ground portion of the perimeter of the access portal, which adjoins the ground or foundation, hinging the terminal ends of the contoured frame to the ground or foundation where the hinging axis is collinear with the membrane attachment to the ground or foundation, thereby allowing the contoured frame to pivot toward and away from the enclosed space of the air-supported struck, attaching the functional means (e.g. door, fan or fans, vent, etc.) to the hinged, contoured frame, and removing the air-supported structure's membrane within the hinged, contoured frame, whereby the access portal may move with the membrane in the wind and to the ground or foundation in the event of deflation without creating undue stress on the membrane in the vicinity of the attached frame.

The second primary method for reducing stress of the air-supported structure's membrane at an access portal comprises the attaching a frame to the air-supported structure's membrane at an access portal on the above-ground portion of the perimeter of the access portal, which adjoins the ground or foundation, hinging the terminal ends of the frame to the ground or foundation where the hinging axis is collinear with the membrane attachment to the ground or foundation, thereby allowing the frame to pivot toward and away from the enclosed space of the air-supported structure, attaching an edge of a shroud membrane of predetermined width to the hinged frame, attaching the other edge of the shroud membrane to stationary framing for the functional means (e.g. door, fan or fans, vent, etc.), and removing the air-supported structure's membrane within the hinged frame, whereby the hinged frame of the access portal may move with the air-supported structure's membrane in the wind and to the ground or foundation in the event of deflation without creating undue stress on the membrane in the vicinity of the attached frame.

An improved second method for reducing stress of the air-supported structure's membrane at an access portal comprises bending an access portal frame to follow the natural (inflated and undisturbed) contour of the air-supported structure's membrane at the access portal, then attaching the frame to the air-supported structure's membrane at an access portal on the above-ground portion of the perimeter of the access portal, which adjoins the ground or foundation, hinging the terminal ends of the contoured frame to the ground or foundation where the hinging axis is collinear with the membrane attachment to the ground or foundation, thereby allowing the contoured frame to pivot toward and away from the enclosed space of the air-supported structure, attaching an edge of a shroud membrane of predetermined width to the hinged, contoured frame, attaching the other edge of the shroud membrane to stationary framing for the functional means (e.g. door, fan or fans, vent, etc.), and removing the air-supported structure's membrane within the hinged, contoured frame, whereby the hinged, contoured frame of the access portal may move with the air-supported structure's membrane in the wind and to the ground or foundation in the event of deflation without creating undue stress on the membrane in the vicinity of the attached frame.

In each of these methods, the frame transfers the primarily vertical lines of stress in the membrane just above the frame to the ground or foundation by the tension within the frame. This is the tension that would have been directed to the ground or foundation via the membrane within the access portal, had the membrane within the access portal not been removed to allow for access. The frame transfers this tension to the ground or foundation so that the adjacent membrane does not have to channel this additional stress, as the membrane adjacent to the frame already carries the stress of the unframed area directly above it.

The hinging means reduces lateral stress during periods of movement of the membrane in the wind. The first primary method and its improved method are only effective when the functional means that attach directly to the frame are of low angular inertia (i.e. of low mass at a distance from the hinging axis). Otherwise, dynamic forces of a heavy frame swinging to and fro would stress the surrounding membrane.

A method for combining the regulation the internal static pressure of the structure and providing means of ingress and egress is comprised of opening the means of ingress and egress, such as a sliding or follow-up door, when the internal static pressure exceeds the desired pressure, closing the means of ingress and egress when the internal static pressure drops below the desired pressure, providing means to override the regulation the internal static pressure momentarily to briefly fully open the means of ingress and egress for passage, whereby the internal pressure is regulated at a desired pressure and passage is allowed.

An improved method for combining the regulation the internal static pressure of the structure and providing means of ingress and egress is comprised of opening the means of ingress and egress, such as a sliding or follow-up door, when the internal static pressure exceeds the desired pressure, closing the means of ingress and egress when the internal static pressure drops below the desired pressure, providing simultaneous means to override the regulation the internal static pressure momentarily to briefly fully open the means of ingress and egress for passage and increase the intake flow, thereby compensating for the momentarily increased exhaust flow, whereby the internal pressure is regulated at a desired pressure and passage is allowed.

This improved method is the preferred method of pressure regulation within the ventilated, air-supported structure described in this invention as it allows for significant ventilation and ingress and egress of equipment, such as tractors. Also, by combining the functions of pressure regulation, through control of intake and exhaust flows, and passage, the number of access portals is reduced, thereby increasing the structures' stability and portability while decreasing the cost.

DRAWINGS

DETAILED DESCRIPTION

Figure 1:
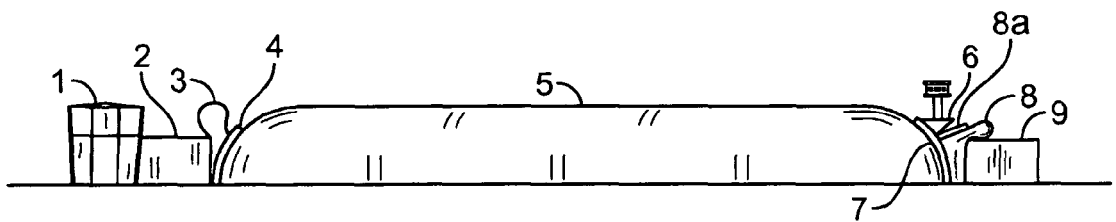
FIG. 1 is an elevation view of a ventilated, pressurized air-supported structure.

FIG. 1 is an elevation view of a ventilated, pressurized air-supported structure showing an air intake system, including a wind assisted intake tower 1 and housing 2 for one or more fans, on one side of the air-supported structure and, on the other side, a pressure regulating exhaust vent 6 and an airlock for passage 9. Tower 1 captures any available wind and directs the flow into one or more fans which may further pressurize the airflow into the internal space of the air-supported structure which acts as an air duct to channel the airflow to the exhaust vent 6 and out of the structure. Also shown are attachments, a hinged, air intake portal frame 4 connected to the air-supported structure's membrane 5 and fan housing 2 by way of a flexible shroud 3, which allows the frame 4 to move with membrane 5 and fully pivot to the ground in the event of deflation without breaking the seal of the strut. Similarly shown are hinged, airlock and exhaust vent portal frame 7, airlock and exhaust vent shroud 8, and airlock and exhaust vent shroud deflector 8a, which keeps shroud 8 from interfering with the exhaust of vent 6 and acts as a windbreak, along with shroud 8, to prevent wind (coming from the direction of the airlock 9) from interfering with the exhaust of vent 6.

Figure 2:
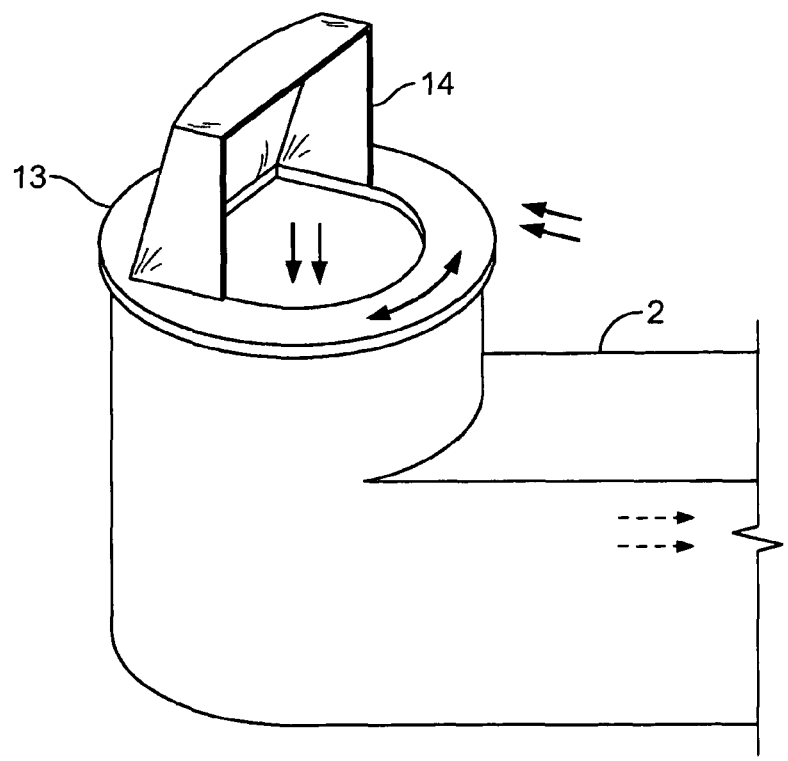
FIG. 2 is a perspective view of an air intake tower with a rotatable air scoop on top connected to a housing containing one or more intake fans.

FIG. 2 is a perspective view of an air intake tower with a rotatable air scoop 14 connected to a turntable 13 on top of the tower, which is connected to a housing 2 containing one or more intake fans. The straight arrows show the direction of the wind flow and airflow into the structure. The curved, double headed arrow shows the rotatable motion of the turntable 13. The air scoop is located to the side of the axis of rotation of turntable 13 with the opening toward the axis, thereby automatically pointing the opening of the air scoop 14 into the wind.

Figure 3:
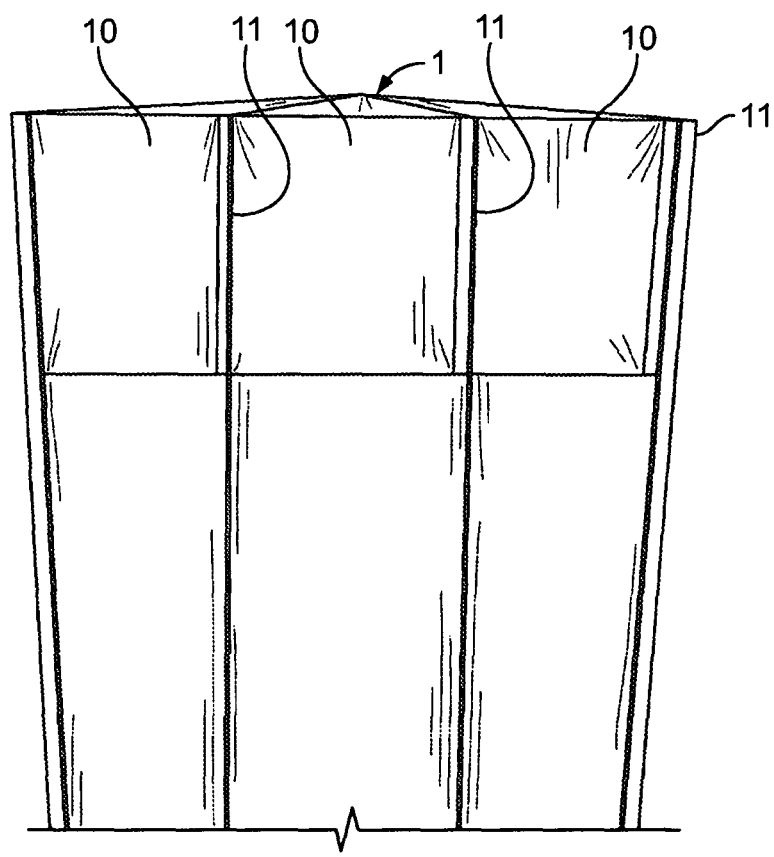
FIG. 3 is an elevation view of an air intake tower with intake flaps hinged on near vertical axes in the upper portion of the tower.

FIG. 3 is an elevation view of an air intake tower 1 with intake flaps 10 hinged on near vertical axes at air intake tower framing 11 in the upper portion of the tower. The flaps 10 only open inward, thereby operating as an intake of any available wind flow and pressure.

Figure 4:
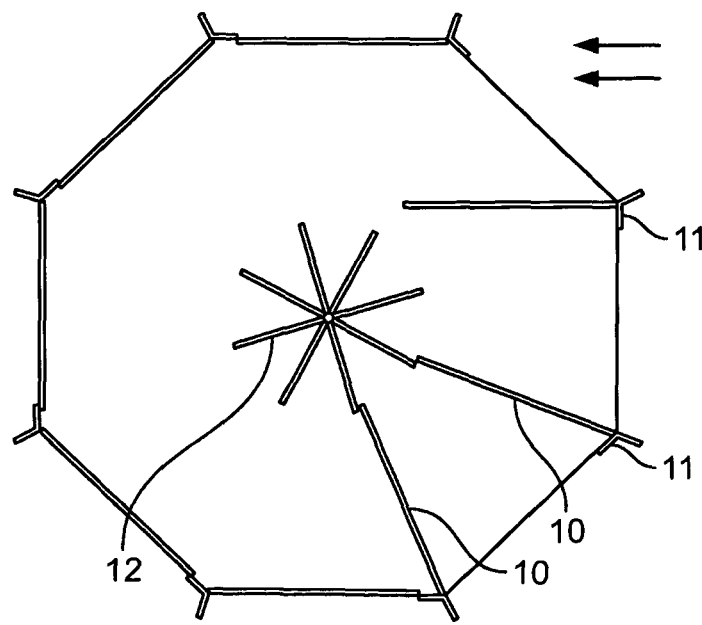
FIG. 4 is a horizontal cross-sectional view of intake area of the tower in FIG. 3 operating with an external wind normally incident on one of the intake ports.

FIG. 4 is a horizontal cross-sectional view of intake area of the tower in FIG. 3 operating with an external wind normally incident on one of the intake ports. Air intake tower flap stops 12 act to prevent flaps 10 from interfering with the motion, arc, of any adjacent flap and prevent flaps 10 from moving past a point of no return torque. Framing 11 provides the stops to prevent flaps 10 from opening outward and means to hinge flaps 10 to the near vertical vertices of the tower. The arrows show the direction of external wind flow. Flaps on the downwind side are closed to prevent the escape of wind flow from the tower.

Figure 5:
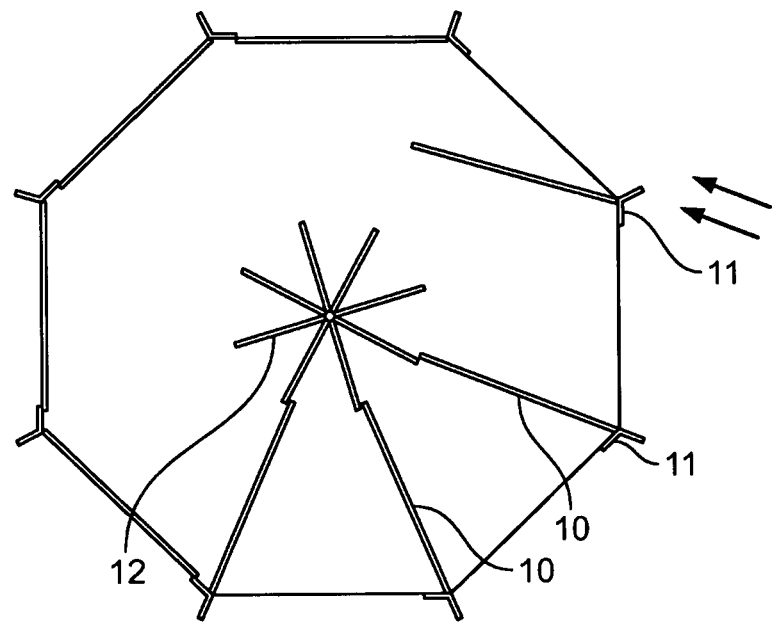
FIG. 5 is a horizontal cross-sectional view of intake area of the tower in FIG. 3 operating with an external wind obliquely incident on the intake ports.

FIG. 5 is a horizontal cross-sectional view of intake area of the tower in FIG. 3 operating with an external wind obliquely incident on the intake ports. This is the same as FIG. 4, except that the external wind flow, indicated by arrows, is in a slightly differing direction.

Figure 6:
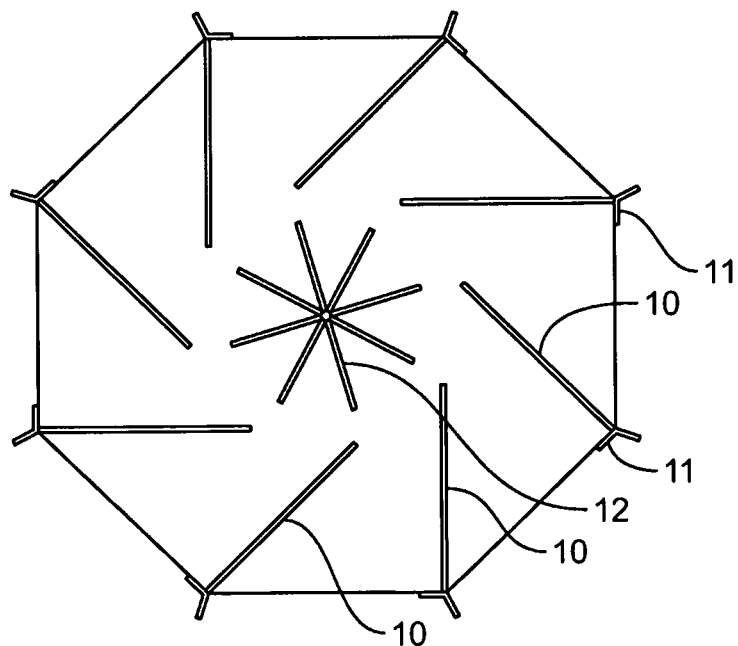
FIG. 6 is a horizontal cross-sectional view of intake area of the tower in FIG. 3 operating with no external wind.

FIG. 6 is a horizontal cross-sectional view of intake area of the tower in FIG. 3 operating with no external wind. Here, there is no preferred intake port and each flap is opened inward approximately the same amount.

Figure 7:
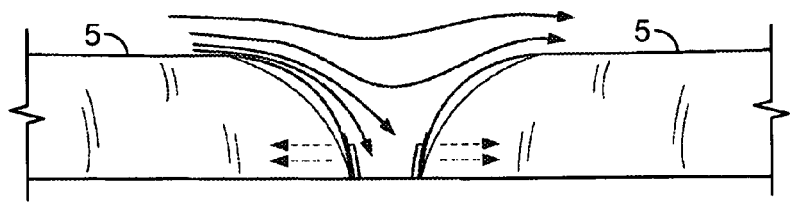
FIG. 7 is an elevation view of two back-to-back, inline, ventilated, pressurized air-supported structures with streamlines of external wind.

FIG. 7 is an elevation view of two back-to-back, inline, ventilated, pressurized air-supported structures with streamlines of external wind. Here, an intake tower is replaced by the configuration of the structures themselves, shown more fully in FIG. 8. The shape of the structure's membrane 5 acts as an airfoil to direct some of the wind flow into the intake area, between the two structures shown. The static pressure in the intake area is higher than he static pressure of the external wind flow as indicated by the upwardly curve streamlines above the intake area (i.e. some of the wind's dynamic pressure is converted to static pressure). One or more fans then may augment this higher pressure and direct airflow, dashed arrows, into the air-supported structure.

Figure 8:
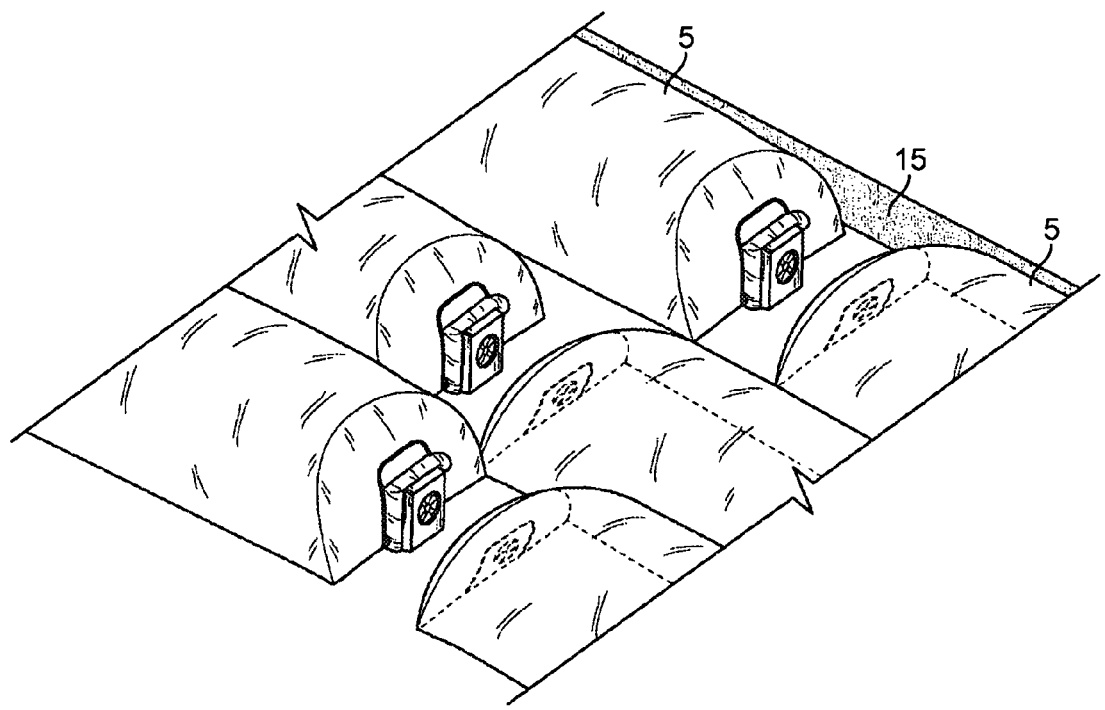
FIG. 8 is a perspective view of a portion of a staggered array of back-to-back, inline, ventilated, pressurized air-supported structures with a perimeter windbreak.

FIG. 8 is a perspective view of a portion of a staggered array of back-to-back, inline, ventilated, pressurized air-supported sutures with a perimeter windbreak This array produces the higher pressure zones in the structure's intake areas, described in FIG. 7. The rounded windbreak simulates an adjacent structure, acting as an airfoil.

Figure 9:
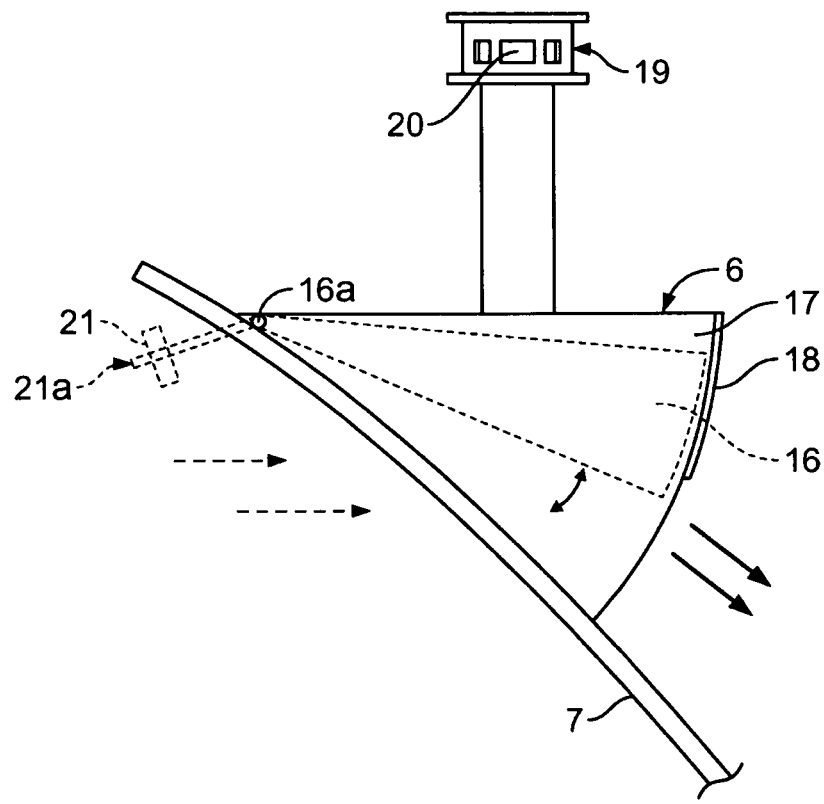
FIG. 9 is an elevation view of a pressure regulating exhaust vent.

FIG. 9 is an elevation view of a p e red, exhaust vent 6. The exhaust vent external pressure accumulator 19 acts similarly to the air intake tower of FIG. 3. Its inwardly opening flaps 20 allow the external wind's total pressure to enter the accumulator, which is conduced to the exhaust vent external pressure area 17 and pushes on the upper portion of the wedged-shaped exhaust vent flap 16 which is rigidly connected to the lower portion of flap 16, pivoting on axis 16*a* The counter balance weight 21 can be positioned on counter balance 21*a*.which is rigidly connected to flap 16, to adjust the closing torque of flap 16, thereby adjusting the membrane offset pressure (which would be the minimal pressure required to support the membrane in the event of no wind). The exhaust vent external pressure seal 18 acts to minimize to air loss from external pressure area 17. This will maintain an internal static pressure close to that of the external total pressure plus the membrane offset pressure. To reduce the internal pressure by a portion of the external dynamic pressure, an orifice (not shown) at the top of accumulator 19 may be used. This would maintain the pressure within the accumulator 19 and the external pressure area 17 between the external static pressure and the external total pressure. The larger the orifice, in relation to flaps 20 area, the closer the pressures in locations 17 and 19 will be to the external static pressure.

Figure 10:
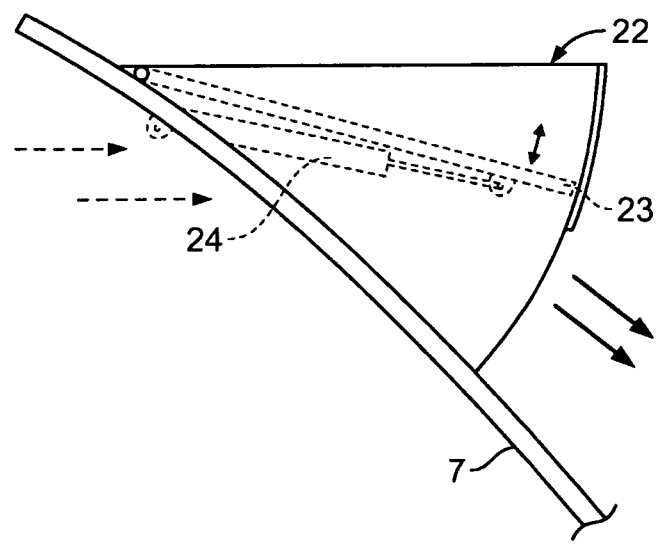
FIG. 10 is an elevation view of a mechanically controlled exhaust vent.

FIG. 10 is an elevation view of a mechanically controlled exhaust vent 22. A mechanical exhaust vent flap 23 is opened and closed by a linear actuator 24. This type of exhaust vent may be used in combination with pressure transducers for determining external static and dynamic pressures and internal static pressure.

Figure 11:
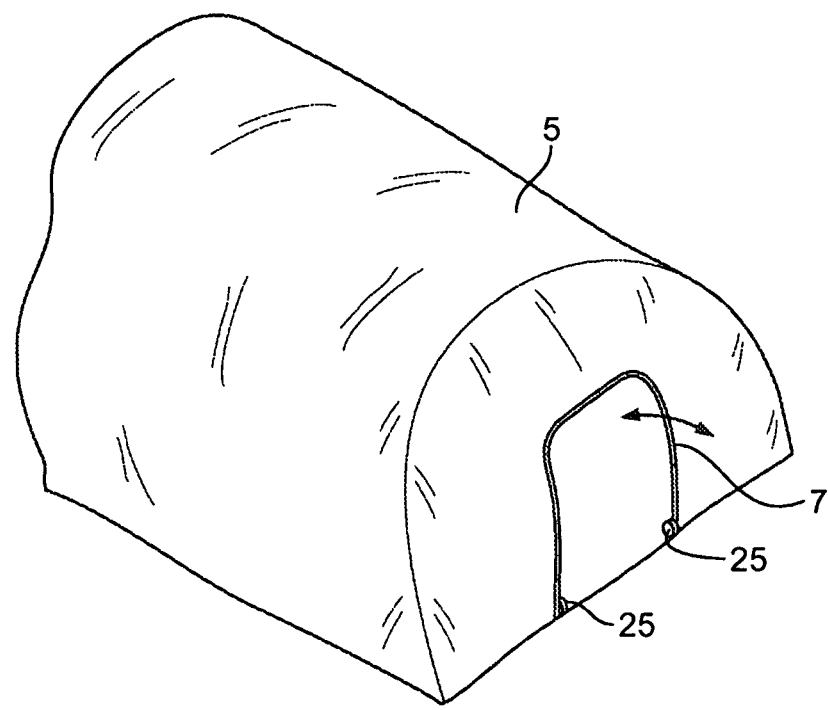
FIG. 11 is a perspective view of a hinged frame attached to one end of an air-supported structure.

FIG. 11 is a perspective view of a hinged frame 7 attached to one end of an air-supported structure. The axis of the hinges 25 is collinear with the attachment of the membrane 5 with the ground, thereby allowing the hinged frame 7 to move with the membrane 5 and pivot to the ground in the event of deflation.

Figure 12:
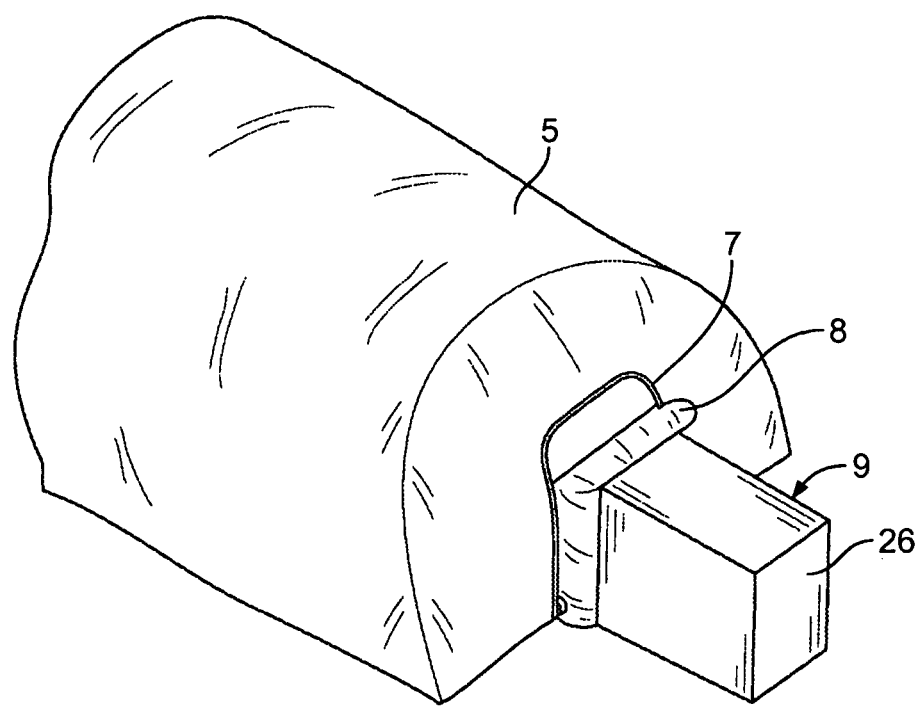
FIG. 12 is a perspective view of a hinged frame attached to one end of an air-supported structure and a shroud, which is attached to an airlock.

FIG. 12 is a perspective view of a hinged frame 7 attached to one end of an air-supported structure and a shroud 8, which is attached to an airlock 9, with outer door 26. A portion of the membrane within the frame 7 shown in FIG. 11 has been removed to allow for passage. The flexible shroud 8 has been connected to the frame 7 and the airlock 9 to prevent the loss of air from the air-supported structure, while allowing for travel of the hinged frame 7.

REFERENCE NUMERALS 1 air intake tower
2 housing for one or more intake fans
3 air intake shroud
4 hinged, air intake portal frame
5 membrane of air-supported structure
6 pressure regulated exhaust vent
7 hinged, airlock and exhaust vent portal frame
8 airlock and exhaust vent shroud
8*a* airlock and exhaust vent shroud deflector
9 airlock
10 air intake tower flaps
11 air intake tower framing
12 air intake tower flap stops
13 turntable for rotatable air scoop
14 air scoop
15 rounded windbreak
16 wedged-shaped exhaust vent flap
17 exhaust vent external pressure area
18 exhaust vent external pressure seal
19 exhaust vent external pressure accumulator
20 exhaust vent external pressure accumulator flap
21 exhaust vent counter balance weight
21*a* exhaust vent counter balance
22 mechanical exhaust vent
23 mechanical exhaust vent flap
24 mechanical exhaust vent linear actuator
25 frame hinges
26 air lock outer door

What I claim is:

1. A method of pressurizing and ventilating a structure comprising: directing a wind flow that is external to a structure into a mechanical flow mechanism connected with and arranged as an inlet to the structure, the wind flow being automatically received in a direction of a maximum force of the wind flow's dynamic pressure into the mechanical flow mechanism, the directing creating an airflow from the mechanical flow mechanism into the structure; directing the airflow into an internal space of the structure; directing the airflow through the internal space of the structure; directing the airflow out of the internal space of the structure through an exhaust means to an area external to the structure; and whereby the internal space of the structure is reliably ventilated and pressurized with assistance of the wind flow that is external to the structure and the mechanical flow mechanism.

2. The method of claim 1, wherein the mechanical flow mechanism is an internal pressure regulating mechanical flow means.

3. The method of claim 2, wherein the exhaust means further comprises a means for controlling the airflow.

4. The method of claim 3, wherein air temperature, solar insolation, and/or humidity levels determine the amount airflow controlled by the means for controlling the airflow.

5. The method of claim 1, wherein the exhaust means is an internal pressure regulating exhaust means.

6. The method claim 1, wherein the structure is an air-supported structure.

7. The method of claim 1, wherein the exhaust means is an internal pressure regulating exhaust means, and wherein the mechanical flow mechanism further comprises a means for controlling the airflow.

8. The method of claim 1, wherein the mechanical flow mechanism contributes to the airflow used to ventilate and support the structure when the external wind flow is below 10 miles per hour (mph).

9. The method of claim 1, wherein the wind flow that is external to the structure is received by at least one of a substantially hollow tower, a berm, and a rotatable air scoop that is located at a sufficient distance from any structure so as not to be significantly affected by those structures.

10. A structure comprising:
a mechanical flow mechanism;
an exhaust means;
a means for directing a wind flow that is external to the structure into the mechanical flow mechanism connected with and arranged as an inlet to the structure, the wind flow being automatically received in a direction of a maximum force of the wind flow's dynamic pressure into the mechanical flow mechanism, the directing creating an airflow from the mechanical flow mechanism into the structure, the means for directing a wind flow configured to automatically accommodate the wind flow's dynamic pressure to direct the maximum force into the mechanical flow mechanism;
a means for directing the airflow into an internal space of the structure;
a means for directing the airflow through the internal space of the structure; and
a means for directing the airflow out of the internal space of the structure through the exhaust means to an area external to the structure,
whereby the mechanical flow mechanism and the wind flow that is external to the structure reliably ventilate and pressurize the structure.

11. The structure of claim 10, wherein the internal static pressure regulating means adjusts operation of the mechanical flow mechanism to regulate the internal static pressure within the structure.

12. The structure of claim 10, wherein the internal static pressure regulating means adjusts operation of the exhaust means to regulate the internal static pressure within the structure.

13. The structure of claim 10, wherein the means for directing wind flow that is external to the structure into the mechanical flow mechanism comprises a rotatable air scoop containing means for directing an intake opening of said rotatable air scoop into the wind; and
a substantially hollow tower connected to said rotatable air scoop.

14. The structure of claim 10, wherein the mechanical flow mechanism is an internal pressure regulating mechanical flow means, and wherein the exhaust means have flow control, and,
wherein the means for directing an external wind flow and external wind pressure into the mechanical flow means comprises
a wind deflector surrounding an intake area of the mechanical flow means.

15. The structure of claim 14, wherein the wind deflector comprises three or more adjacent structures arranged in a staggered array, wherein:
the intake portal of a first structure faces the intake portal of a second structure and the intake portals of the first and second structures are separated by a distance greater than a diameter of the mechanical flow mechanism; and
a sidewall of a third structure is adjacent to sidewalls of the first and second structures, so that the intake portal the first structure and of the second structure is surrounded on three sides by a rounded surface of a height greater than or comparable to the height of the mechanical flow mechanism.

16. The structure of claim 10, wherein the structure is an air-supported structure, wherein the air-supported structure further comprises a membrane and a frame, where the frame supports an access portal.

17. The structure of claim 16, wherein the frame comprises two terminal ends, where each terminal end comprises a hinge.

18. The structure of claim 10, wherein the means for directing wind flow that is external to the structure into the mechanical flow mechanism comprises:
a substantially hollow tower with an upper portion with a horizontal cross section of a substantially regular polygon;
hinged flaps with a near vertical axis connected to the upper portion of the substantially hollow tower, where the hinged flaps cover intake ports on each side of the substantially regular polygon, where the hinged flaps open inward;
stop means for the hinged flaps that prevent the hinged flaps from opening outward;
closing means to provide a torque on the hinged flaps sufficient to close each of the hinged flaps that are on a leeward side of said substantially hollow tower; and
second stop means for the hinged flaps that prevent the hinged flaps from interfering with movement of any adjacent flap, where the second stop means prevent the hinged flaps from moving past a point of no closing torque.

19. The structure of claim 10, wherein the mechanical flow mechanism contributes to the airflow used to ventilate and support the structure when the external wind flow is below 10 miles per hour (mph).

20. The structure of claim 10, wherein the mechanical flow mechanism is an internal pressure regulating mechanical flow means, and wherein the exhaust means have flow control.

21. The structure of claim 10, wherein the means for directing a wind flow that is external to the into the mechanical flow mechanism comprises:
- wind deflectors surrounding an intake area of the mechanical flow mechanism, wherein the wind deflectors surround the mechanical flow mechanism on all sides with a height equal to or greater than a height of the mechanical flow mechanism at a horizontal distance from an intake of the mechanical flow mechanism equal to or greater than the height of the mechanical flow mechanism, wherein the wind deflectors have a rounded top.

22. The structure of claim 21, wherein the wind deflectors comprise the attached structure and adjacent structures.

* * * * *